US009194357B2

(12) United States Patent
Huang

(10) Patent No.: US 9,194,357 B2
(45) Date of Patent: Nov. 24, 2015

(54) METHOD FOR JUMP STARTING A VEHICLE

(71) Applicant: Yung-Sheng Huang, Taipei (TW)

(72) Inventor: Yung-Sheng Huang, Taipei (TW)

( * ) Notice: Subject to any disclaimer, the term of this patent is extended or adjusted under 35 U.S.C. 154(b) by 360 days.

(21) Appl. No.: 13/694,308

(22) Filed: Nov. 19, 2012

(65) Prior Publication Data

US 2014/0138960 A1 May 22, 2014

(51) Int. Cl.
*H02J 7/00* (2006.01)
*F02N 11/08* (2006.01)
*F02N 11/14* (2006.01)

(52) U.S. Cl.
CPC ............ *F02N 11/0866* (2013.01); *F02N 11/14* (2013.01)

(58) Field of Classification Search
CPC ..... H02J 7/0034; H02J 7/0054; H02J 7/0042; H02J 2001/006; Y02E 60/12
USPC .......................................................... 320/105
See application file for complete search history.

(56) References Cited

U.S. PATENT DOCUMENTS

| | | | | |
|---|---|---|---|---|
| 3,654,538 | A * | 4/1972 | Gardberg | 320/105 |
| 6,791,464 | B2 | 9/2004 | Huang | |
| 2002/0041174 | A1* | 4/2002 | Purkey | 320/103 |
| 2004/0149016 | A1* | 8/2004 | Kano et al. | 73/40 |
| 2006/0164033 | A1* | 7/2006 | Bolz et al. | 320/104 |
| 2012/0025768 | A1* | 2/2012 | Nakano et al. | 320/116 |

* cited by examiner

*Primary Examiner* — Arun Williams
(74) *Attorney, Agent, or Firm* — Michael de Angeli

(57) ABSTRACT

A method for jump starting a vehicle comprising causing a control unit to set a reference voltage by choosing a point from a chart plotting voltage across a starting battery versus time during a vehicle start; determining whether the voltage across a starting battery of the vehicle is less than the reference voltage; closing a switch if the determination is positive, thereby causing an external power source to supply high current to the starting battery; adding the high current and current from the starting battery to obtain a total current; and supplying the total current to a starter motor of the vehicle so as to start the vehicle. An apparatus for thus jump starting a vehicle is also disclosed.

25 Claims, 8 Drawing Sheets

METHOD FOR JUMP STARTING A VEHICLE

BACKGROUND OF THE INVENTION

1. Field of the Invention

The invention relates to a method for jump starting a vehicle disabled by a depleted starting battery by connecting an external power source to the disabled vehicle's battery to quickly supply sufficient current to the vehicle's battery which in turn supplies required power to a starter motor for starting the disabled vehicle.

2. Description of Related Art

It is typical to jump start a vehicle disabled due to a dead battery. Jump starting is a method of starting a vehicle powered by an internal combustion engine when the vehicle's battery has been discharged. A second battery (often in another vehicle) is temporarily connected to provide starting power to the disabled vehicle. Once the disabled vehicle's engine is running, its alternator or generator, should recharge the discharged battery, so the second battery can be disconnected.

However, it can be quite difficult for a motorist to find another motorist to provide a jump start especially when the problem occurs at night or in a remote area. Calling an automobile repair shop is a solution. But its cost is high. Emergency road servicing may not be available. To provide an effective, reliable emergency assistance kit to enable a motorist to deal with a dead battery is therefore an object of the invention.

SUMMARY OF THE INVENTION

It is therefore one object of the invention to provide a method of jump starting a vehicle comprising the steps of causing a control unit to set a reference voltage by choosing a point from a chart plotting voltage versus time during a starting process; determining whether the voltage across a starting battery of the vehicle is less than the reference voltage or not; closing a switch if the determination is positive, thereby causing an external power source to supply additional current to the vehicle's discharged starting battery for a predetermined period of time; adding the sufficient current and current from the discharged starting battery to obtain a total current; and supplying the total current to a starter motor of the vehicle so as to start the disabled vehicle.

It is another object of the invention to provide an apparatus for jump starting a vehicle having a starter motor and a starting battery connected to the starter motor, the apparatus of the invention comprising in combination a control unit; an external power source connected in parallel to the starting battery by a switch controlled by the control unit; wherein the control unit sets a reference voltage by choosing a point Q from a chart plotting voltage across the starting battery versus time for a curve representing a starting process; wherein the control unit determines whether the voltage across the starting battery is less than the reference voltage; wherein the switch is closed when the voltage across the starting battery is less than the reference voltage as determined by the control unit; wherein the external power source supplies a sufficient current to the starting battery, such that the current from the external power source and the current from the starting battery are added to obtain a total current; and wherein the total current is supplied to the starter motor so as to start the vehicle.

The above and other objects, features and advantages of the invention will become apparent from the following detailed description taken with the accompanying drawings.

DETAILED DESCRIPTION OF THE INVENTION

Figure 5:
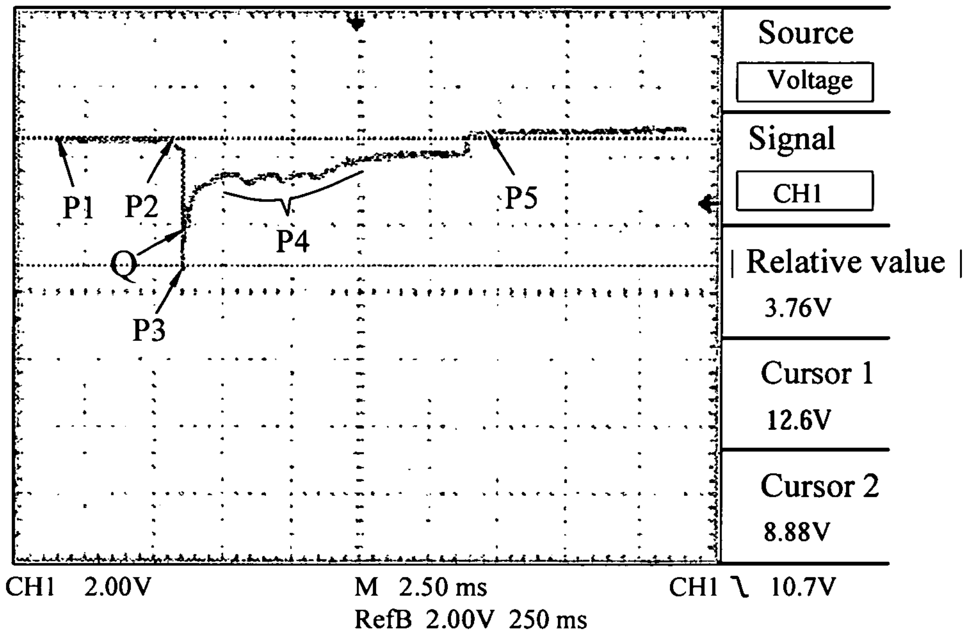
FIG. 5 is a chart plotting voltage across a starting battery versus time during a vehicle start.

As mentioned, FIG. 5 is a chart plotting voltage across a starting battery versus time during a vehicle starting operation. A similar curve is observed in both normal and jump starts, i.e., the sharp drop-off in battery voltage between points P2, the voltage across the battery prior to initiation of the starting operation, and P3, the minimum voltage measured during the starting operation, is due to the large initial current drawn by operation of the starter motor. Operation of the starter motor during cranking of the engine, is represented by section P4 of the curve, and P5 shows the voltage increase after the engine starts, when the alternator or generator provides recharging current to the battery. According to the invention, a reference voltage point Q is chosen from a point beginning at point P2 and ending at point P5 by referring to the specifications of an automobile starting battery, manufacturer, and type. More specifically, point Q is chosen such that if the starting battery's voltage is at least equal to Q, the battery will likely be able to start the vehicle; if not, a jump start or other assistance will likely be required. According to one aspect of the present invention, a method of providing additional power to the starter motor is provided, so that the vehicle engine can be started.

Figure 1:
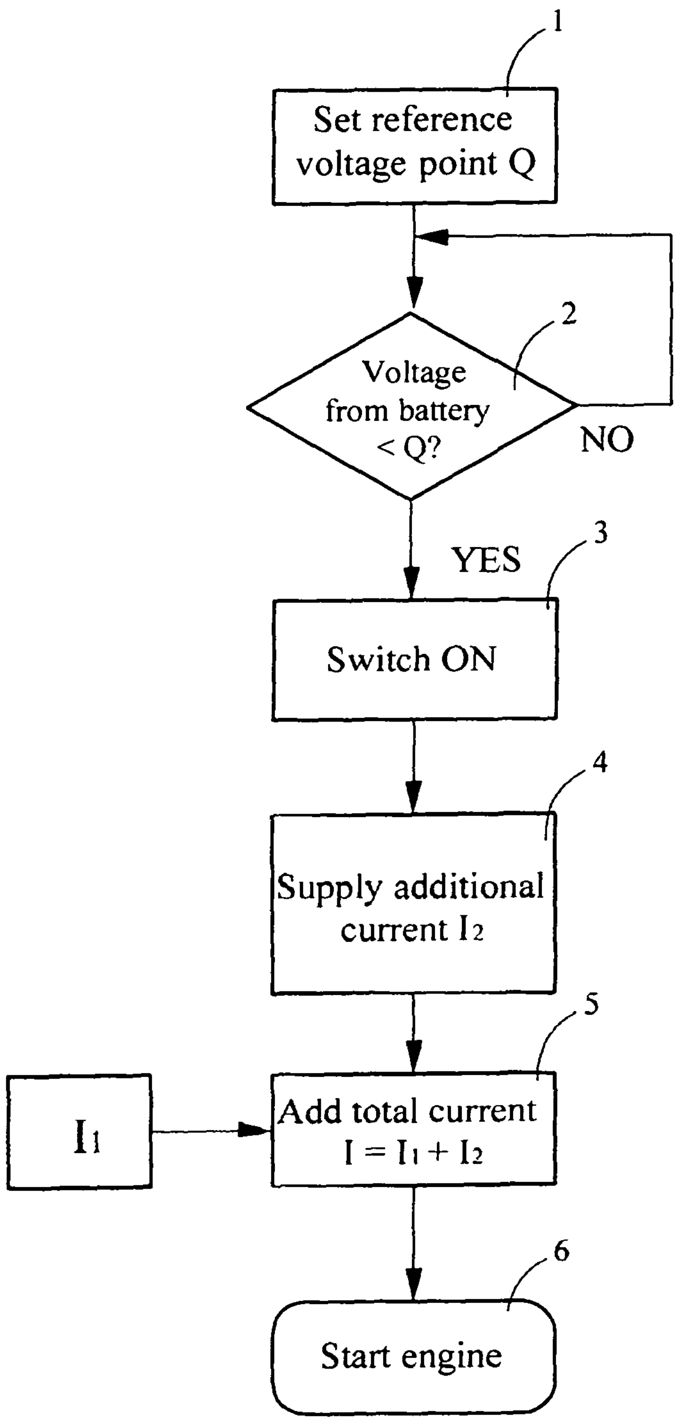
FIG. 1 is a flow chart illustrating a method for jump starting a vehicle according to the invention.

Referring to FIG. 1, a flow chart illustrating a method of jump starting a vehicle in accordance with the invention, the method comprising the following steps:

Step 1: A reference voltage point Q is set by a control unit.

Step 2: It is determined whether the voltage across the starting battery of the vehicle is less than a reference voltage point Q or not. If the determination is yes, the flow chart goes to next step 3. Otherwise, the flow chart returns to step 1.

Step 3: A switch 35 (discussed further below) is closed (i.e., ON) automatically, connecting an external power source to the vehicle's discharged battery.

Step 4: The external power source supplies additional current $I_2$ to the vehicle's discharged battery.

Step 5: Current $I_2$ and current $I_1$ from the vehicle's discharged battery are added to obtain a total current I (i.e., $I=\mathbf{1}_1+I_2$).

Step 6: The total current I is supplied to a starter motor of the vehicle so that the disabled vehicle can be started successfully.

Figure 2:
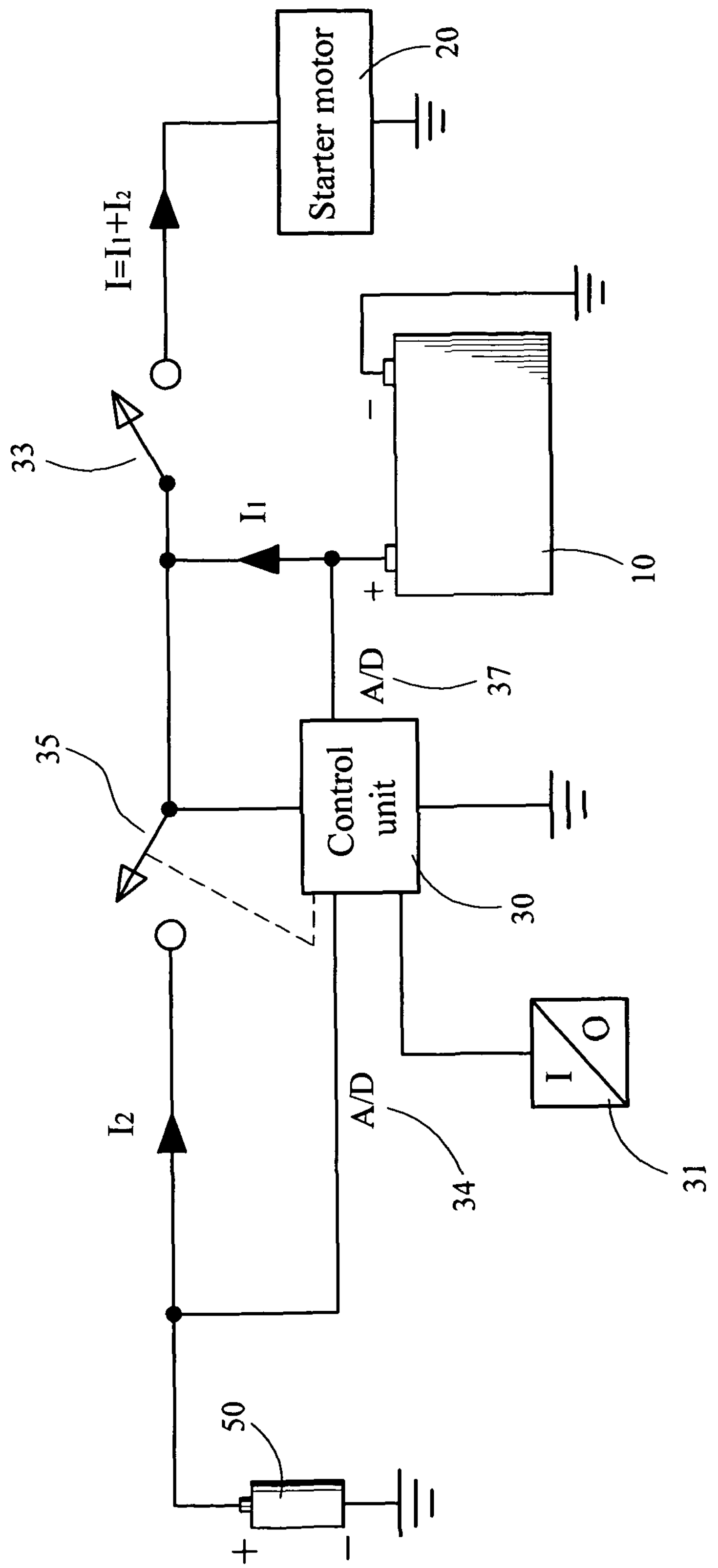
FIG. 2 schematically depicts an apparatus for jump starting a vehicle according to a first preferred embodiment of the invention.

Referring to FIG. 2, an apparatus for jump starting a vehicle according to a first preferred embodiment of the invention comprises the following components, as discussed in detail below.

A starting battery 10 is connected to a starter motor 20, through a conventional switched connection 33. A control unit 30 is connected to the starting battery 10 through an analog to digital converter (A/D) 37 so as to be able to measure the voltage across the battery 10. Control unit 30 controls operation of a switch 35 so as to connect an external power source 50 in parallel with the starting battery 10. An input and output device (e.g., audible and light device, a video display, or a voltage or current value display) 31 may be provided and is connected electrically to the control unit 30, e.g., for display of the status of the external power source and associated components, The control unit 30 can set a reference voltage Q and determine whether an output voltage of the starting battery 10 of a disabled vehicle is less than the reference voltage Q (e.g., a point between P2 and P5 in FIG. 5) employing an analog to digital converter (A/D) 37 which uses sampling to convert a continuous quantity (i.e., the voltage across the starting battery 10) to a discrete time representation in digital form. That is, the control unit 30 can monitor the voltage across the starting battery 10 during a normal start, effectively generating the data shown in FIG. 5, and can then select the point Q between points P2 and P5, more typically between P2 and P3. A second A/D 34 can be provided to monitor the voltage of the external power source 50.

Preferably, the control unit 30 is an electronic control unit, as detailed further below.

The external power source 50 is implemented as one or more cells of a mobile phone, a battery of a laptop computer, one or more cells of an iPad, one or more cells of an iPhone, or one or more cells of other types of portable electronic device. Experiment shows that the relatively small batteries of these devices can in fact provide sufficient additional current for a short time to serve as auxiliary power sources for jump starting vehicles. Alternatively, a dedicated external power source assembly (not shown) can be implemented as a plurality of series and/or parallel-connected cells.

The switch 35 is closed (ON) automatically by control unit 30, connecting the external power source 50 to the starting battery 10, when the output voltage of the starting battery 10 of the disabled vehicle is less than the reference voltage Q as determined by the control unit 30. When the vehicle's starting circuit 33 is then activated, the external power source 50 supplies high current $I_2$ to the vehicle's discharged starting battery 10. Current $I_2$ and current $I_1$ from the vehicle's discharged starting battery 10 are added to obtain a total current I (i.e., $I=I_1+I_2$). The total current I is supplied to the starter motor 20 of the vehicle so that the disabled vehicle can be started successfully.

Preferably, the external power source 50 can supply high current $I_2$ (e.g., 0.1A to 550A) of low voltage (e.g., 0.5V to 12V). More preferably, the high current $I_2$ is 1A to 50A. The typical period of application of this current is between 0.001 second and 30 seconds; more preferably, between 0.001 second and 5 seconds.

In one embodiment, the control unit, switch 35, and A/Ds 34 and 37 could be provided as a unit adapted to be connected between the vehicle's electrical system (e.g., by plug-in connection to an auxiliary jack) and a portable electronic device such as a mobile phone. In this way power from the battery of the mobile phone could conveniently be added to that of the vehicle starting battery as needed to start a disabled vehicle. The control unit 30 could also be provided with a pair of spring clamps, or the like, for direct connection to the terminals of the starting battery 10.

Figure 2A:
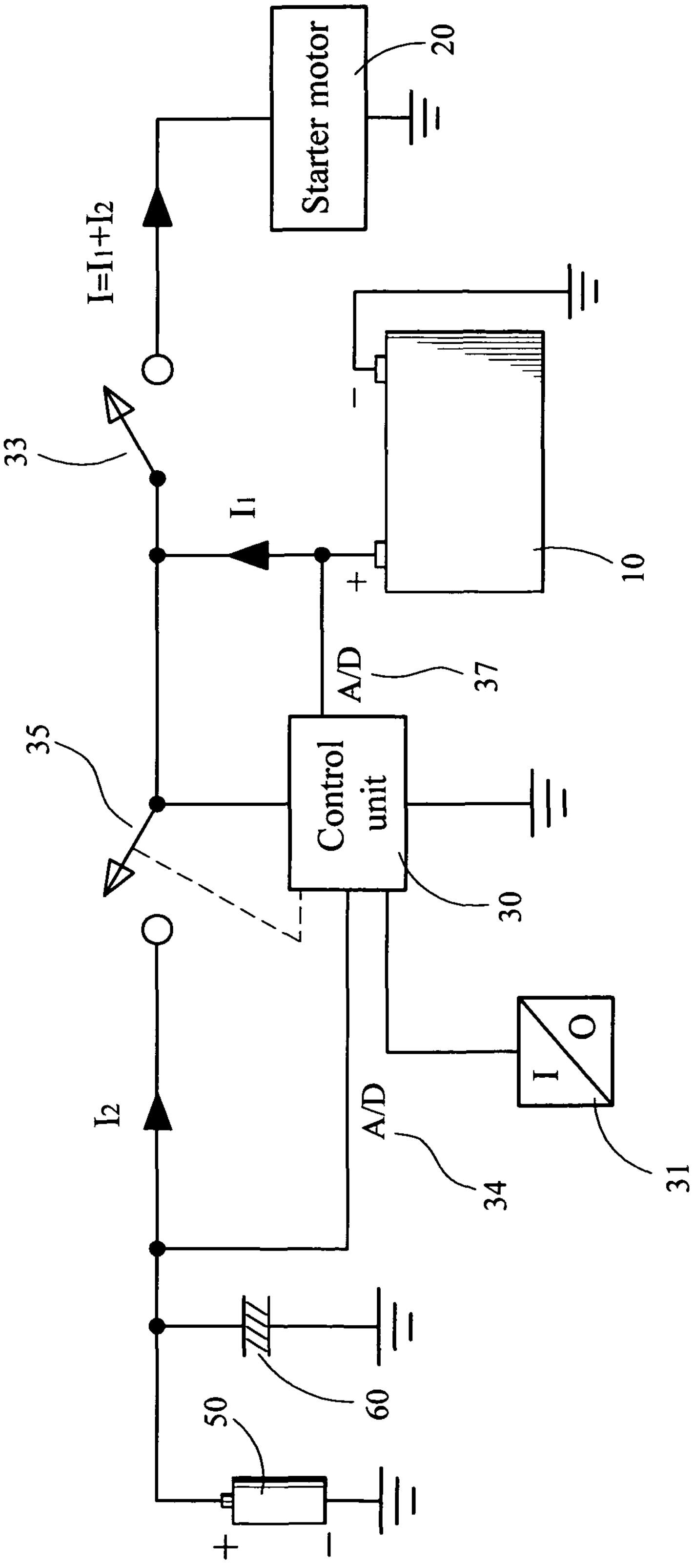
FIG. 2A schematically depicts an apparatus for jump starting a vehicle according to a second preferred embodiment of the invention.

Referring to FIG. 2A, an apparatus for jump starting a vehicle in accordance with a second preferred embodiment of the invention is shown. The characteristics of the second preferred embodiment are substantially the same as that of the first preferred embodiment of FIG. 2, except the following:

A first capacitor 60 is provided in parallel to the external power source 50 for storing electrical energy supplied therefrom. The first capacitor 60 can store output current from the external power source 50 so as to supply high current $I_2$ of required voltage to the starter motor 20.

As above, the switch 35 is closed (ON) automatically by control unit 30 when the output voltage of the starting battery 10 of the disabled vehicle is less than the reference voltage Q as determined by the control unit 30. The external power source 50 and the first capacitor 60 then together supply high current $I_2$ to the vehicle's discharged starting battery 10. Current $I_2$ and current $I_1$ from the vehicle's discharged starting battery 10 are added to obtain a total current I (i.e., $I=I_1+I_2$). The high current I is supplied to the starter motor 20 of the vehicle when the primary starting circuit 33 is closed, so that the disabled vehicle can be started successfully.

Figure 2B:
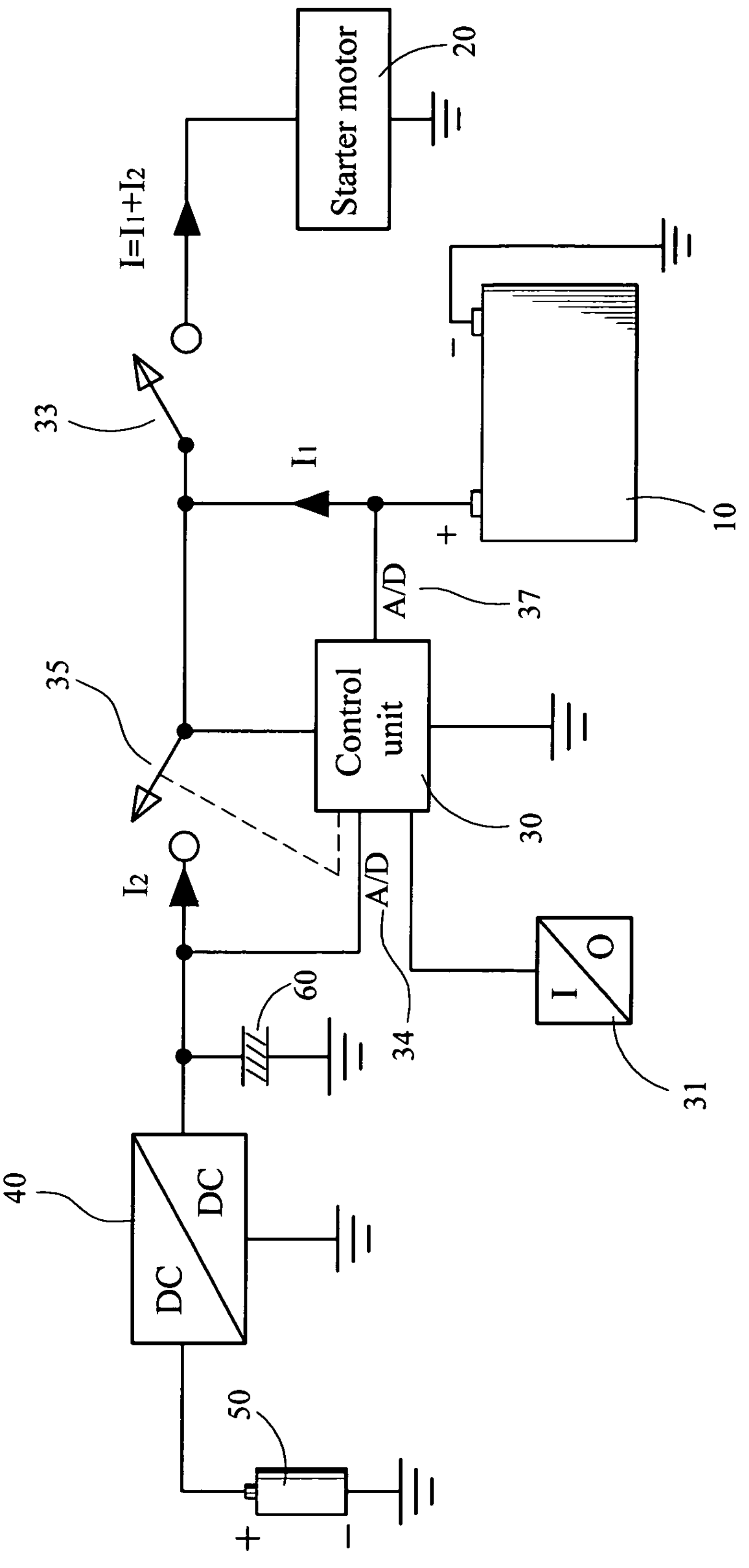
FIG. 2B schematically depicts an apparatus for jump starting a vehicle according to a third preferred embodiment of the invention.

Referring to FIG. 2B, an apparatus for jump starting a vehicle in accordance with a third preferred embodiment of the invention is shown. The characteristics of the third preferred embodiment are substantially the same as that of the second preferred embodiment of FIG. 2A, except the following:

A direct current to direct current (DC/DC) converter 40 is provided to interconnect the external power source 50 and the control unit 30. DC/DC converter 40 is provided to raise the voltage from the battery of the external power source 50 (e.g., 6 volts) to a higher voltage (e.g., 12 volts) for supply to the starter motor 20. A first capacitor 60 is provided in parallel to the DC/DC converter 40 for storing electrical energy supplied therefrom. The first capacitor 60 can store output current from the external power source 50 to high current $I_2$ of required voltage.

Again, the switch 35 is closed (ON) automatically by control unit 30 when the output voltage of the starting battery 10 of the disabled vehicle is less than the reference voltage Q as determined by the control unit 30. The DC/DC converter 40 and the first capacitor 60 then together supply high current $I_2$ to the vehicle's discharged starting battery 10. Current $I_2$ and current $I_1$ from the vehicle's discharged starting battery 10 are added to obtain a total current I (i.e., $I=I_1+I_2$). The high current I is supplied to the starter motor 20 of the vehicle so that the disabled vehicle can be started successfully.

Figure 2C:
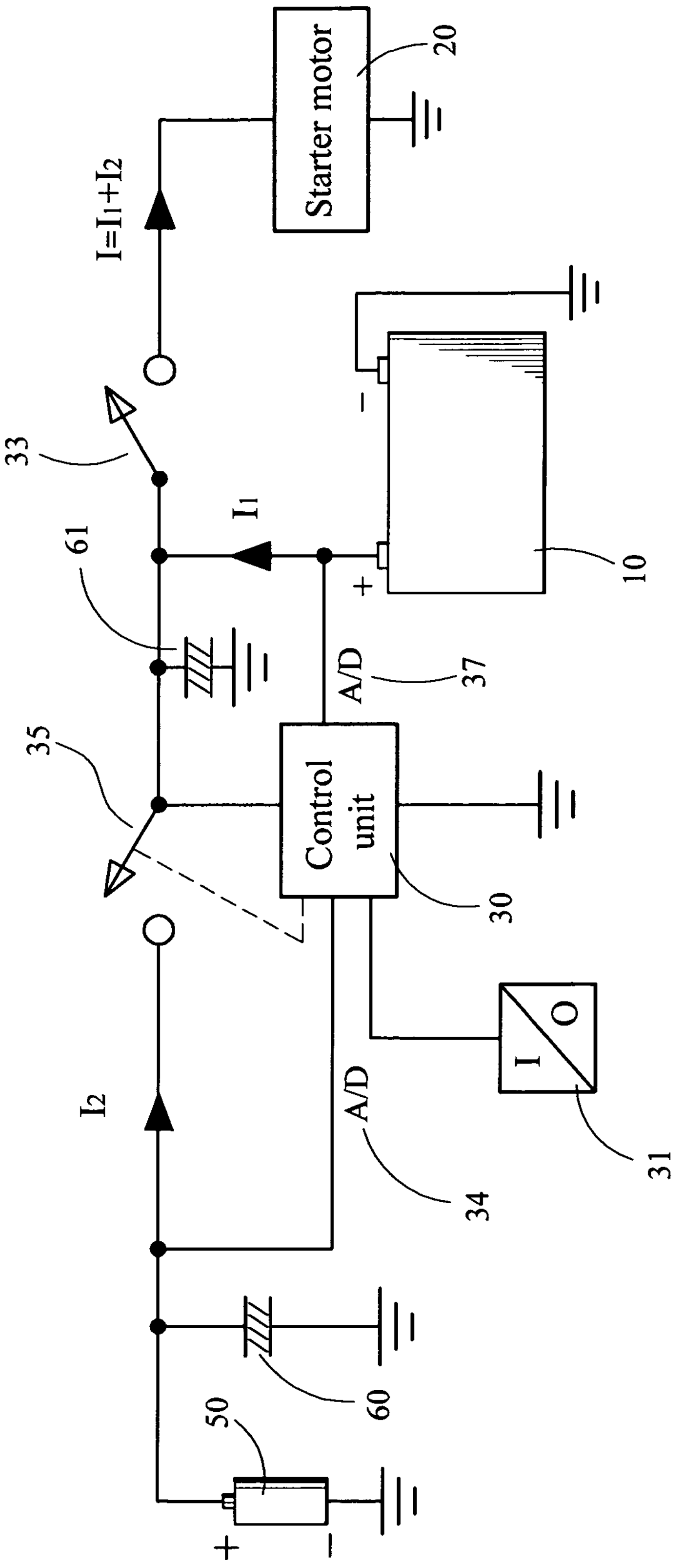
FIG. 2C schematically depicts an apparatus for jump starting a vehicle according to a fourth preferred embodiment of the invention.

Referring to FIG. 2C, an apparatus for jump starting a vehicle in accordance with a fourth preferred embodiment of the invention is shown. The characteristics of the fourth preferred embodiment are substantially the same as that of the second preferred embodiment of FIG. 2A except the following:

In addition to the first capacitor 60 provided in parallel to the external power source 50 for storing electrical energy supplied therefrom, a second capacitor 61 is provided in parallel to the starting battery 10 for storing electrical energy supplied therefrom. The first capacitor 60 can store output current from the external power source 50 to high current $I_2$ of required voltage and the second capacitor 61 can similarly store output current from the starting battery 10 to high current $I_1$ of required voltage.

Preferably, the capacitance of each of the first capacitor 60 and the second capacitor 61 is in the range of 0.01F to 1,000F depending on the capacity of the external power source 50.

As above, the switch 35 is closed (ON) automatically by control unit 30 when the output voltage of the starting battery 10 of the disabled vehicle is less than the reference voltage Q, as determined by the control unit 30. The external power source 50, the first capacitor 60, and the second capacitor 61 then together supply high current $I_2$ to the vehicle's discharged starting battery 10. Current $I_2$ and current $I_1$ from the vehicle's discharged starting battery 10 are added to obtain a total current I (i.e., $I=I_1+I_2$). The high current I is supplied to the starter motor 20 of the vehicle so that the disabled vehicle can be started successfully.

Figure 3:
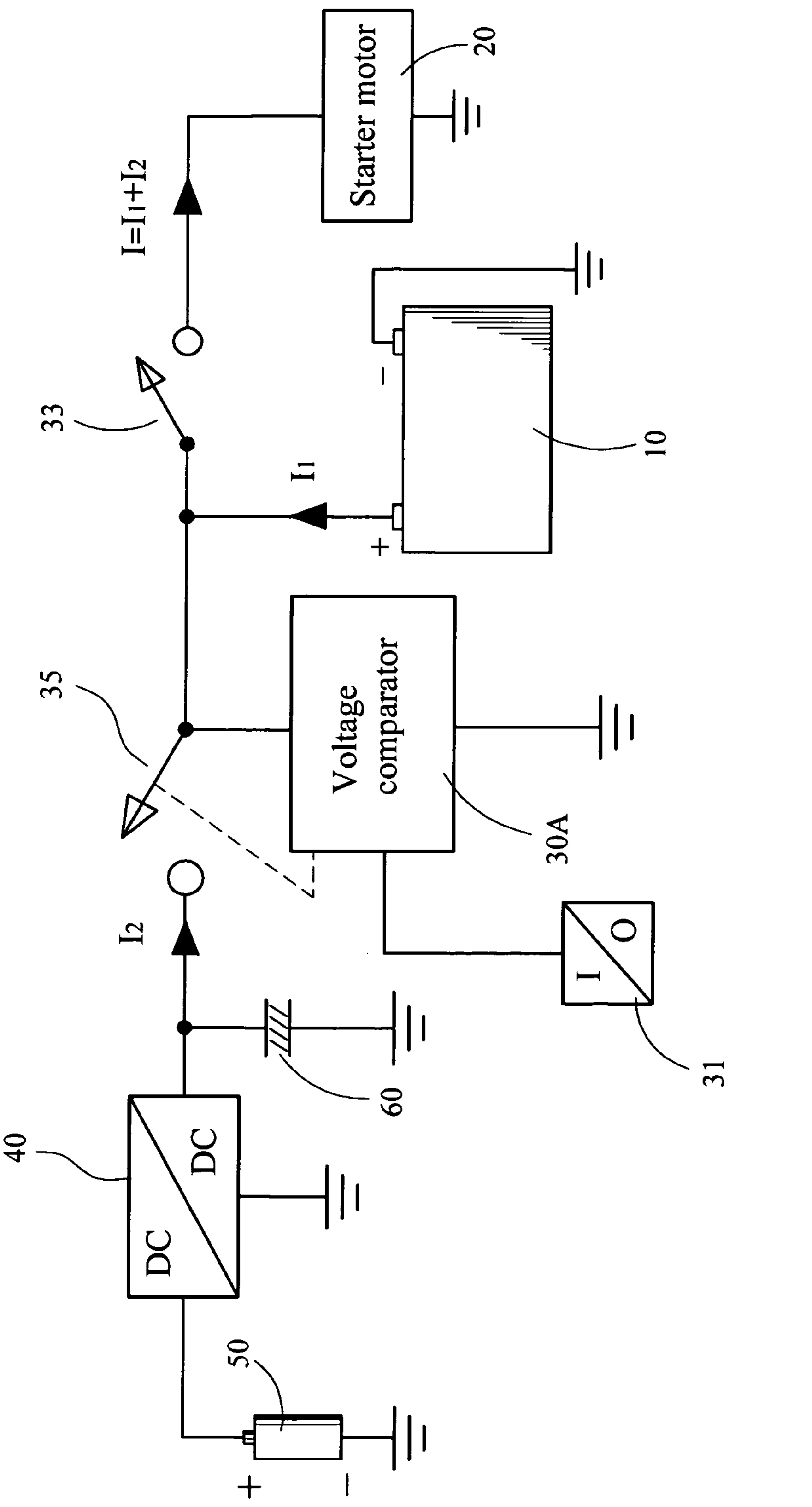
FIG. 3 schematically depicts an apparatus for jump starting a vehicle according to a fifth preferred embodiment of the invention.

Referring to FIG. 3, an apparatus of jump starting a vehicle in accordance with a fifth preferred embodiment of the invention is shown. The characteristics of the fifth preferred embodiment are substantially the same as that of the third preferred embodiment of FIG. 2B except the following:

A voltage comparator 30A is provided to replace the control unit 30 and the two A/Ds 34 and 37. The voltage comparator 30A compares the output voltage of the starting battery 10 of the disabled vehicle with the reference voltage Q. The switch 35 is closed (ON) automatically when the output voltage of the starting battery 10 of the disabled vehicle is less than reference voltage Q as a result of the comparison made by the voltage comparator 30A. As in the embodiment of FIG. 2B, a DC/DC converter 40 is provided in series with the external power source 50 and a first capacitor 60 is provided in parallel to the DC/DC converter 40 for storing electrical energy supplied therefrom. The first capacitor 60 can store output current of the external power source 50 to provide high current $I_2$.

Figure 4:
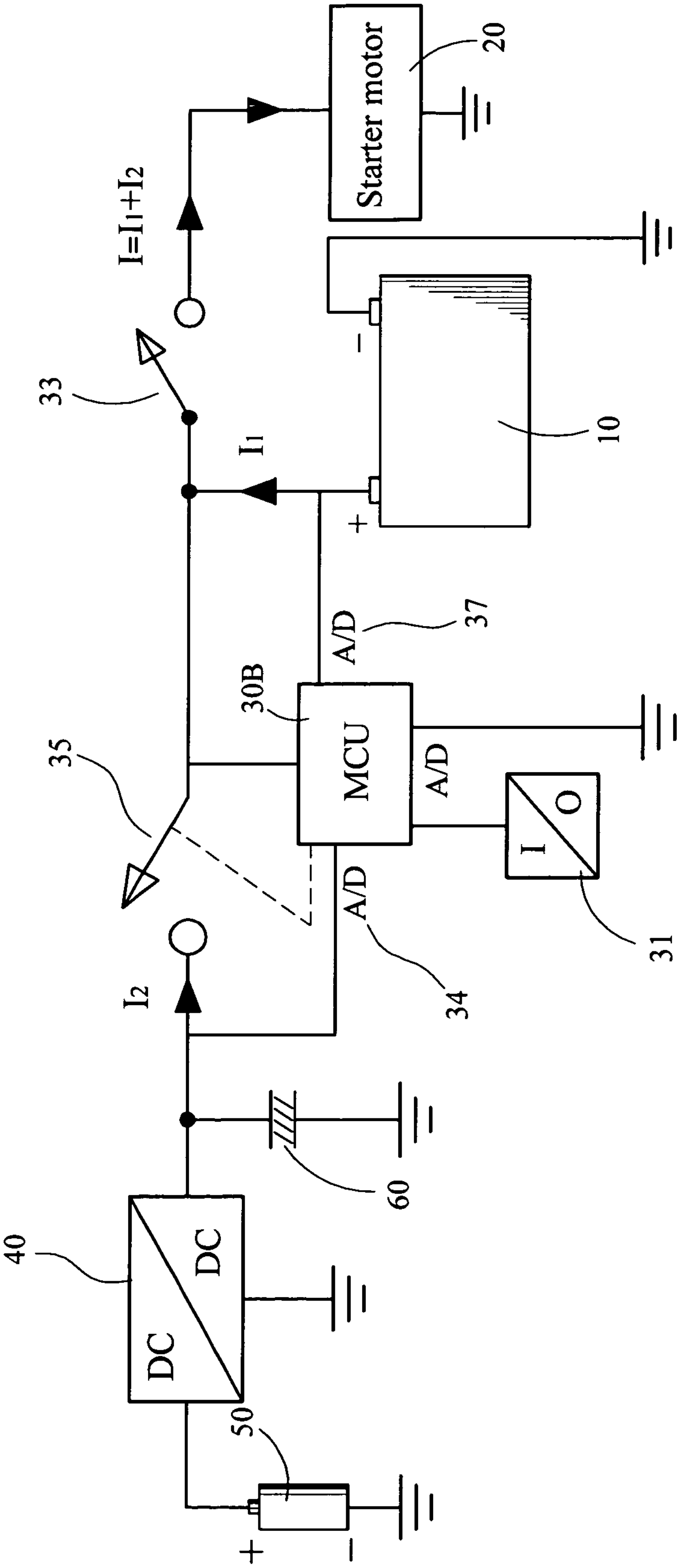
FIG. 4 schematically depicts an apparatus for jump starting a vehicle according to a sixth preferred embodiment of the invention.

Referring to FIG. 4, an apparatus for jump starting a vehicle in accordance with a sixth preferred embodiment of the invention is shown. The characteristics of the sixth preferred embodiment are substantially the same as that of the third preferred embodiment of FIG. 2B except the following:

The control unit 30 is replaced by a microcontroller unit (MCU) 30B which is a single chip that contains a processor, RAM, ROM, clock and I/O control unit. The MCU 30B can determine whether the input voltage from the starting battery 10 of the disabled vehicle is less than reference voltage point Q by cooperating with the two A/Ds 34 and 37. The switch 35 is closed (ON) automatically when the input voltage from the starting battery 10 of the disabled vehicle is less than the reference voltage point Q as a result of the determination made by the MCU 30B. As above, the current $I_2$ from the external power source 50 and the current $I_1$ from the vehicle's discharged starting battery 10 are added to obtain a total current I (i.e., $I=I_1+I_2$). The high current I is supplied to the starter motor 20 of the vehicle so that the disabled vehicle can be started successfully.

As above, FIG. 5 is a chart plotting voltage across the starting battery 10 versus time during a starting process of an operable vehicle according to the first, second, third, fourth, fifth or sixth preferred embodiment of the invention. A similar Figure is shown in U.S. Pat. No. 6,791,464. As indicated above, a reference voltage point Q to which the voltage across the starting battery 10 is compared is chosen from a point beginning at point P2 and ending at point P5 by referring to the specifications of an automobile starting battery, manufacturer, performance and type thereof. In general, the reference voltage point Q is selected such that the method of the invention will be implemented when the voltage across the starting battery 10 has fallen to a point where it is unlikely that the starting battery will be unable to start the engine.

While the invention has been described in terms of preferred embodiments, those skilled in the art will recognize that the invention can be practiced with modifications within the spirit and scope of the appended claims.

What is claimed is:

1. A method of jump starting a vehicle comprising the steps of:

measuring a range of voltages across a starting battery of the vehicle during a process of starting the vehicle;

setting a reference voltage point Q by choosing the point Q from the range of voltages across the starting battery of the vehicle measured during the process of starting the vehicle; and in a given starting process, employing a controller to:

determine whether the voltage across the starting battery of the vehicle is less than the reference voltage Q; and if the determination is positive, cause an external power source to supply high current ($I_2$) to the starting battery, thereby adding the high current ($I_2$) to current ($I_1$) from the starting battery to obtain a total current (I); and supplying the total current (I) to a starter motor of the vehicle so as to successfully start the vehicle.

2. The method of claim 1, wherein the period of time of supplying current by the external power source in jump starting the vehicle is between about 0.001 second and 30 seconds.

3. The method of claim 2, wherein the period of time of supplying current by the external power source in jump starting the vehicle is between about 0.001 second and 5 seconds.

4. The method of claim 1, wherein the high current ($I_2$) supplied by the external power source is between about 0.1A and 550A.

5. The method of claim 1, wherein current supplied by the external power source is stored in a capacitor prior to supply to the starter motor of the vehicle.

6. The method of claim 1, wherein the voltage of the current supplied by the external power source is increased to a higher voltage in a DC to DC converter prior to supply to the starter motor of the vehicle.

7. The method of claim 1, wherein said step of setting a reference voltage point Q by choosing the point Q from a range of voltages across a starting battery of the vehicle measured during the process of starting the vehicle is performed by detecting specific points in the variation of range of voltages measured in a starting operation, these points including P2, the voltage prior to initiating the starting operation; P3, the minimum voltage reached at the initiation of the starting operation; P4, the voltage measured during cranking of the engine; and P5, the voltage measured after the engine starts, and choosing reference voltage point Q from between the voltage measured at P2 and the voltage measured at P5.

8. The method of claim 7, wherein reference voltage point Q is chosen from between the voltage measured at P2 and the voltage measured at P3.

9. An apparatus for jump starting a vehicle comprising a starter motor and a starting battery connected to the starter motor, said apparatus comprising:

a control unit connected to the starting battery;

an external power source;

a switch controlled by the control unit to selectively connect the external power source to the starting battery;

wherein during a given starting operation the control unit compares the voltage across the starting battery to a reference voltage Q, said reference voltage Q being a point along a curve of voltage across the starting battery versus time having been measured during a prior starting operation, and closes the switch when the voltage across the starting battery is less than the reference voltage Q such that the external power source supplies a high current ($I_2$) to the starting battery, such that the high current ($I_2$) is added to current ($I_1$) from the starting battery to obtain a total current (I); and the total current (I) is supplied to the starter motor so as to start the vehicle.

10. The apparatus of claim 9, wherein the reference voltage Q is set by the control unit by referring to the specifications of an automobile starting battery, manufacturer, and type.

11. The apparatus of claim 9, further comprising a first capacitor connecting to the external power source for storing electricity from the external power source and supplying high current ($I_2$) when the switch is closed.

12. The apparatus of claim 11, further comprising a second capacitor connected to the starting battery of the vehicle for storing electricity from the starting battery of the vehicle and supplying high current ($I_2$) to the starter motor when the vehicle's starting circuit is activated.

13. The apparatus of claim 9, further comprising a direct current to direct current (DC/DC) converter connected to the external power source so that the voltage of the current ($I_2$) from the external power source can be increased to a value suitable for powering the starter motor.

14. The apparatus of claim 13, further comprising a first capacitor connected to the DC/DC converter so that the voltage of the current ($I_2$) from the external power source can be increased to a value suitable for powering the starter motor by the DC/DC converter and stored in the first capacitor for supply to the starter motor.

15. The apparatus of claim 9, wherein the external power source is implemented as a plurality of cells connected in series, parallel, or series and parallel.

16. The apparatus of claim 9, wherein the control unit further comprises an input and output device for providing an indication of the status of the device.

17. The apparatus of claim 9, wherein the control unit is a microcontroller unit.

18. The apparatus of claim 9, wherein the control unit is a voltage comparator.

19. The apparatus of claim 9, wherein the external power source is one or more cells of a mobile phone, a battery of a laptop computer, or one or more cells of a portable electronic device.

20. The apparatus of claim 9, wherein the high current ($I_2$) is supplied by the external power source for between about 0.001 second and 30 seconds.

21. The apparatus of claim 9, wherein the high current ($I_2$) is supplied by the external power source for between about 0.05 seconds and 5 seconds.

22. The apparatus of claim 9, wherein the high current ($I_2$) supplied by the external power source is between about 0.1A and 550A.

23. The apparatus of claim 11, wherein the first capacitor has a capacitance in the range of 0.01F to 1,000F.

24. The apparatus of claim 9, wherein specific points in the variation of range of voltages measured in a prior starting operation are detected, these points including P2, the voltage prior to initiating the starting operation; P3, the minimum voltage reached at the initiation of the starting operation; P4, the voltage measured during cranking of the engine; and P5, the voltage measured after the engine starts, and wherein reference voltage point Q is chosen from between the voltage measured at P2 and the voltage measured at P5.

25. The apparatus of claim 24, wherein reference voltage point Q is chosen from between the voltage measured at P2 and the voltage measured at P3.

* * * * *